United States Patent
Miyoshi

(10) Patent No.: US 12,547,168 B2
(45) Date of Patent: Feb. 10, 2026

(54) UNMANNED AERIAL VEHICLE CONTROLLER, AND STORAGE MEDIUM

(71) Applicant: FANUC CORPORATION, Yamanashi (JP)

(72) Inventor: Takashi Miyoshi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 172 days.

(21) Appl. No.: 18/250,219

(22) PCT Filed: Nov. 16, 2021

(86) PCT No.: PCT/JP2021/042070
§ 371 (c)(1),
(2) Date: Apr. 24, 2023

(87) PCT Pub. No.: WO2022/107761
PCT Pub. Date: May 27, 2022

(65) Prior Publication Data
US 2023/0400850 A1    Dec. 14, 2023

(30) Foreign Application Priority Data
Nov. 20, 2020  (JP) .................. 2020-193376

(51) Int. Cl.
*G05D 1/00* (2024.01)
*G01C 21/00* (2006.01)
(Continued)

(52) U.S. Cl.
CPC ......... *G05D 1/0022* (2013.01); *G01C 21/206* (2013.01); *G01C 21/383* (2020.08);
(Continued)

(58) Field of Classification Search
CPC .... G05D 1/0022; G05D 1/0088; G05D 1/101; G01C 21/206; G01C 21/383;
(Continued)

(56) References Cited

U.S. PATENT DOCUMENTS 11,787,346 B2 * 10/2023 Smith ............... B60R 9/048
                                                 701/3
2017/0334559 A1 * 11/2017 Bouffard ............. B64U 20/87
2020/0257295 A1 * 8/2020 Park ................. G05D 1/0202

FOREIGN PATENT DOCUMENTS

JP    2018-36867 A       3/2018
JP    2018036867 A  *   3/2018  ............... G05D 1/02
(Continued)

OTHER PUBLICATIONS

Machine translation (Year: 2019).*
(Continued)

*Primary Examiner* — Jean Paul Cass
*Assistant Examiner* — Lidia Kwiatkowska
(74) *Attorney, Agent, or Firm* — HAUPTMAN HAM, LLP

(57) ABSTRACT

In an embodiment, a wireless LAN is installed in a factory. Mechanical equipment of the factory includes a short-range wireless communication unit. An unmanned aerial vehicle stores segmented regions of a three-dimensional map or a two-dimensional map of the factory, and wireless stations to which the unmanned aerial vehicle is to connect in the respective regions. The unmanned aerial vehicle switches the wireless stations to connect to, in accordance with a region in which an own location is present on the three-dimensional map or the two-dimensional map.

8 Claims, 9 Drawing Sheets

(51) Int. Cl.
*G01C 21/20* (2006.01)
*B64U 101/00* (2023.01)

(52) U.S. Cl.
CPC ....... *G05D 1/0088* (2013.01); *B64U 2101/00* (2023.01); *B64U 2201/10* (2023.01)

(58) Field of Classification Search
CPC ........... B64U 2101/00; B64U 2201/10; B64U 10/14; B64U 2101/20; B64U 2101/30; B64C 13/18
See application file for complete search history.

(56) References Cited

FOREIGN PATENT DOCUMENTS

| | | | | |
|---|---|---|---|---|
| JP | 2019-59598 | A | | 4/2019 |
| JP | 2019059598 | A * | | 4/2019 |
| JP | 2020-142326 | A | | 9/2020 |
| WO | WO-2019112104 | A1 * | 6/2019 | ............. B64C 39/02 |

OTHER PUBLICATIONS

Machine translation (Year: 2018).*
International Search Report in PCT/JP2021/042070, mailed Feb. 1, 2022. 4pp.

* cited by examiner

FIG.5

| AREA 1 | WIRELESS LAN |
|---|---|
| AREA 2 | SHORT-RANGE RADIO STATION 1 (DEVICE ID) |
| AREA 3 | WIRELESS LAN |
| AREA 4 | SHORT-RANGE RADIO STATION 2 (DEVICE ID) |
| AREA 5 | SHORT-RANGE RADIO STATION 3 (DEVICE ID) |
| ... | ... |

UNMANNED AERIAL VEHICLE CONTROLLER, AND STORAGE MEDIUM

RELATED APPLICATIONS

The present application is a National Phase of International Application No. PCT/JP2021/042070 filed Nov. 16, 2021, which claims priority to Japanese Application No. 2020-193376 filed Nov. 20, 2020.

TECHNICAL FIELD

The present invention relates to an unmanned aerial vehicle operated in a factory, and a computer-readable storage medium.

BACKGROUND ART

Patent Literature 1 discloses a robot system that includes a robot, a robot controller for controlling the robot, a teaching device for sending a teaching signal for the robot to the robot controller in response to an input of teaching made by an operator, an unmanned aerial vehicle having an imaging device, and a flight control unit for controlling the flight of the unmanned aerial vehicle such that the imaging device can continuously take images of an object necessary for teaching based on the teaching signal during the operation of the robot according to the teaching signal.

In general, robots are sometimes used within fences on a manufacturing floor with consideration for safety. The robot system according to Patent Literature 1 controls the flight of the unmanned aerial vehicle based on the teaching signal for controlling the robot during the operation of the robot, thereby allowing the operator to perform teaching on the robot even in an environment where it is difficult to see the movement of the robot directly from outside the fences.

There have conventionally been an increasing number of cases of using unmanned aerial vehicles (drones) for inventory management in warehouses, and monitoring the status of factories and so on. These unmanned aerial vehicles are flying objects and have flexible movement areas, and thus are expected to be used in new ways.

PRIOR ART DOCUMENT

Patent Literature

[Patent Literature 1] Japanese Patent Laid-Open Publication No. 2020-142326

SUMMARY OF THE INVENTION

Problems to be Solved by the Invention

Technology that utilizes unmanned aerial vehicles is desired in manufacturing floors.

Means for Solving the Problem

One aspect of the present disclosure is an unmanned aerial vehicle that flies around a factory, and includes a first radio communication unit that conducts short-range radio communication with machinery equipment, a second radio communication unit that conducts radio communication whose range is longer than the short-range radio communication, a machinery equipment selection unit that determines whether or not a machinery equipment is selected beforehand as a communication party, and a radio station switching unit that detects a self-location of the unmanned aerial vehicle flying in the factory is in the proximity of the selected machinery equipment and switches the connection to a short-range radio communication station attached to the machinery equipment.

One aspect of the present disclosure is a storage medium that is configured to store computer-readable commands that are executed by one or more processors provided in an unmanned aerial vehicle, which includes a first radio communication unit that conducts short-range radio communication with a machinery equipment and a second ratio communication unit that conducts radio communication which range is longer than the short-range radio communication, so as to determine whether or not a machinery equipment is selected beforehand as a communication party, and detect that a self-location of the unmanned aerial vehicle flying in the factory is in the proximity of the selected machinery equipment to thereby switch the connection to a short-range radio communication station attached to the machinery equipment.

Effect of the Invention

In accordance with the aspect of the invention, an unmanned aerial vehicle can be utilized.

BRIEF DESCRIPTION OF THE DRAWINGS

FIG. 5 shows an example of data stored in a radio switching area storage unit;

MODE FOR CARRYING THE INVENTION

<First Disclosure>

Figure 1:
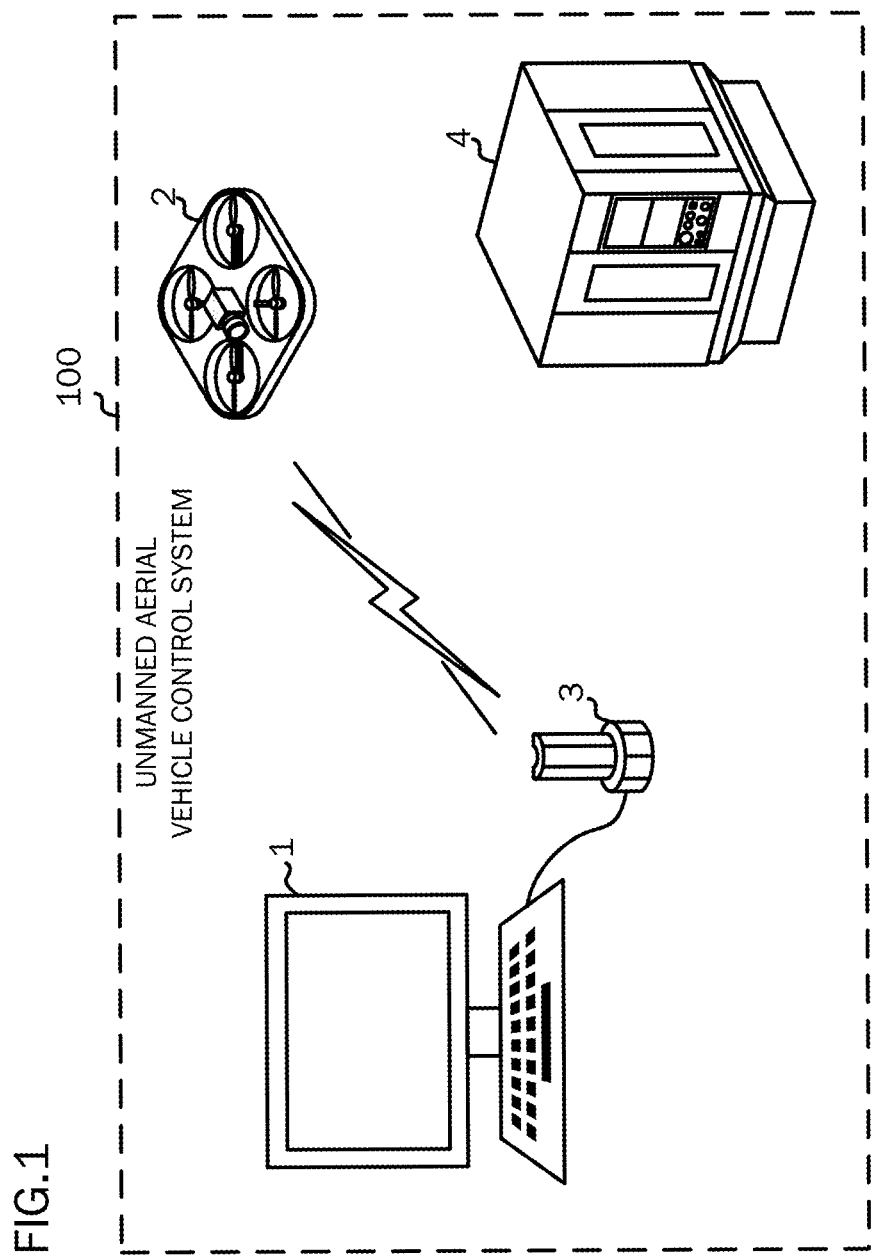
FIG. 1 is a conceptual diagram of an unmanned aerial vehicle control system.

FIG. 1 is a conceptual diagram of an unmanned aerial vehicle control system 100.

The unmanned aerial vehicle control system 100 includes one or more unmanned aerial vehicles 2, a personal computer (PC) 1 that creates a flight plan of the unmanned aerial vehicle 2, a radio communication device 3 that mediates communication between the unmanned aerial vehicle 2 and the PC 1, and a machine 4 that conducts short-range radio communication.

The unmanned aerial vehicle control system 100 is installed in a space in a factory, for instance, where multiple machinery equipment 4 are arranged. The machinery equipment 4 may be such as a an tool and a robot, an air-conditioning equipment and a ventilating equipment, a flameproof and smoke exhaust equipment, an inspection equipment, an piping equipment, and a clean room, but are not limited particularly.

The PC 1 of the unmanned aerial vehicle control system 100 is not limited particularly as long as it is an information processing device, such as a server or mobile terminal.

The machinery equipment 4 may be connected to a wireless local area network (LAN) in the factory. In this case, a flight plan created by the PC 1 can be output to the unmanned aerial vehicle 2 through the short-range radio communication of the machinery equipment 4 to thereby control the unmanned aerial vehicle 2.

Figure 2:
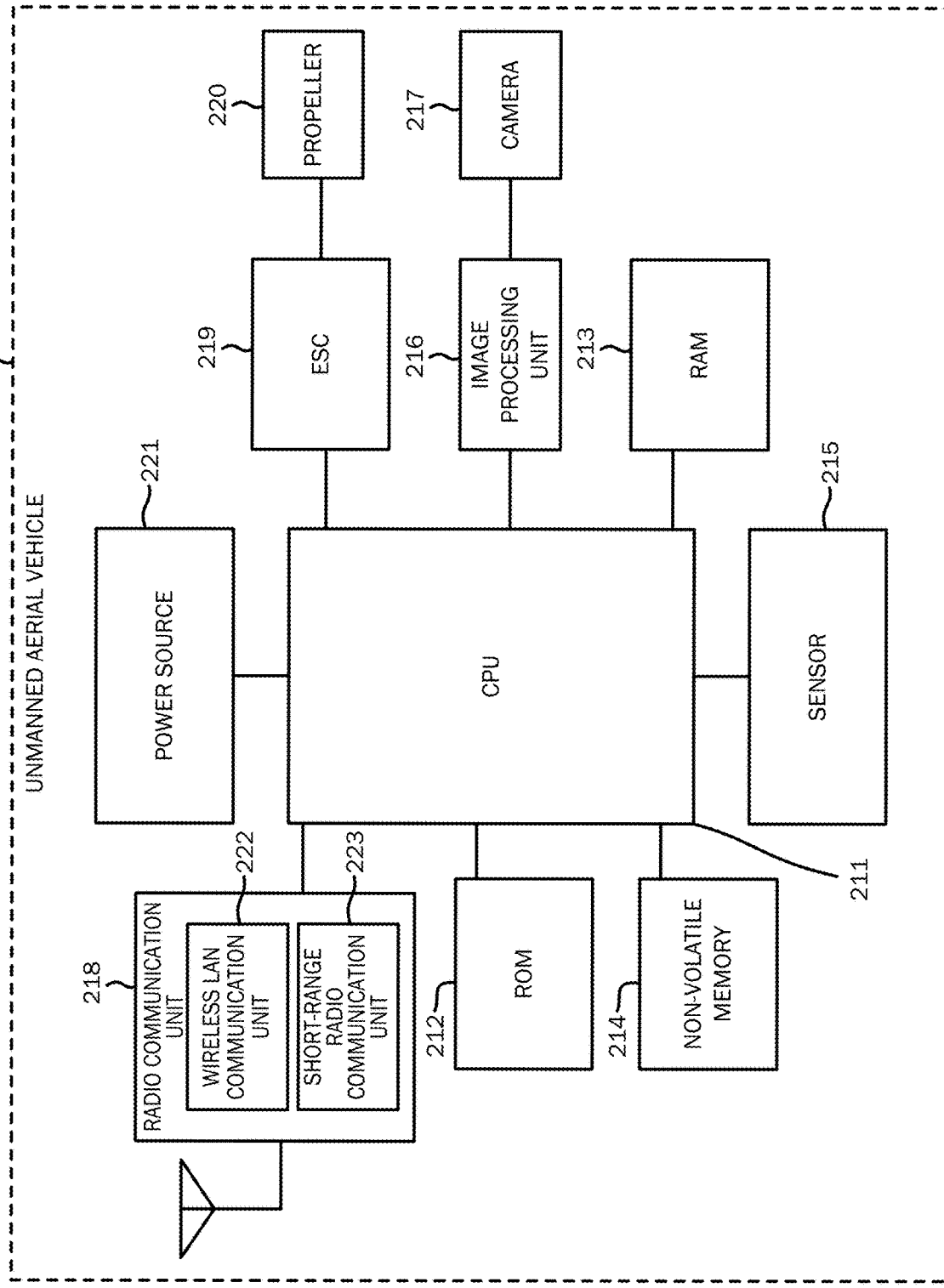
FIG. 2 is a hardware configuration diagram of an unmanned aerial vehicle.

The unmanned aerial vehicle 2 has a hardware configuration shown in FIG. 2. The unmanned aerial vehicle 2 includes a central processing unit (CPU) 211 that is a processor for controlling the overall unmanned aerial vehicle 2. The CPU 211 is configured to read a system program stored in a read-only memory (ROM) 212 via a bus to thereby control the overall unmanned aerial vehicle 2 in accordance with the system program. A random-access memory (RAM) 213 is configured to temporarily store temporary computation data and various pieces of data input by an external device, for instance.

A non-volatile memory 214 consists of a memory which is backed up by a battery, not shown, by way of example. In the non-volatile memory 214, a state of storage of data written therein is retained even when a power source 221 of the unmanned aerial vehicle 2 is turned off. The non-volatile memory 214 is configured to store, for example, pieces of data read from an external device, not shown, and pieces of data obtained from a communication device via a network. The pieces of data stored in the non-volatile memory 214 may be deployed into the RAM 213 when executing/using the unmanned aerial vehicle 2. Furthermore, the ROM 212 is configured to record beforehand various system programs, such as known programs.

A sensor 215 is an accelerometer, an angular velocity sensor, an electronic compass, a pressure sensor or a distance sensor. The electronic compass is for obtaining a direction of the unmanned aerial vehicle by magnetic force. The distance sensor is a light detection and ranging (LIDAR) sensor, for instance, that measures scattering light for pulsed laser irradiation.

The CPU 211 mounted on the unmanned aerial vehicle 2 serves as a flight controller or controller companion, for instance. The CPU 211 does not have to be one, and a plurality of CPUs 211 may be mounted depending on their functions. The CPU 211 serving as a flight controller is configured to properly adjust the attitude and location of the airframe based on information acquired from a sensor 215. The CPU 211 determines tilt and movement of the unmanned aerial vehicle 2 based on an amount of speed variation of the unmanned aerial vehicle 2 acquired by an accelerometer, determines changes in the tilt and direction of the unmanned aerial vehicle 2 based on an amount of change in a rotational speed of the unmanned aerial vehicle 2 acquired from an angular velocity sensor, and determines the altitude of the unmanned aerial vehicle 2 based on air pressure acquired from a pressure sensor.

The CPU 211 serving as a controller companion is configured to also determine two-dimensional or three-dimensional point group data based on a value of scattering light acquired by a LIDAR sensor. The point group data will be an environmental map around the unmanned aerial vehicle 2. In addition to that, the CPU 211 can perform successive estimation of a movement amount of the unmanned aerial vehicle 2 by matching point groups to one another. The movement amount is added up so that a self-location can be estimated. Furthermore, the estimation of the self-location of the unmanned aerial vehicle 2 may be conducted by combining the point group data obtained by the LIDAR sensor and values acquired from the accelerometer and the angular velocity sensor.

Instead of the LIDAR sensor, an infrared sensor, an ultrasonic sensor or a radar sensor with radio waves may be used as a distance sensor. A camera or an image sensor can also be used as a distance sensor, in place of the LIDAR sensor. In a case of using a camera, an AR marker, an AR tag, a QR code (registered trademark) or similar can be used in combination with the camera. As an example of using no distance sensors, there is a method for estimating the self-location by using beacons. The present disclosure does not particularly limit a method for estimating the self-location of the unmanned aerial vehicle 2.

An image processing unit 216 is configured to convert images taken by a camera 217 into appropriate data and output the data to the CPU 211. The camera 217 of the unmanned aerial vehicle 2 mainly takes pictures of a machinery equipment 4 selected by a user. This allows the user to grasp the state of a factory, such as values indicated by instruments provided to the machinery equipment 4 and an operating condition of the machinery equipment 4.

A radio communication unit 218 includes a wireless LAN communication unit 222 and a short-range radio communication unit 223.

The wireless LAN communication unit 222 is a radio station for Wi-Fi (registered trademark), for example. The wireless LAN communication unit 222 conducts communication with the radio communication device 3. The communication area of the radio communication device 3 includes all over the factory (or throughout the flight route of the unmanned aerial vehicle 2).

The short-range radio communication unit 223 is a radio station for Bluetooth (registered trademark), for instance. The short-range radio communication unit 223 conducts communication with a short-range radio communication unit 41 incorporated in the machinery equipment 4.

An electric speed controller (ESC) 219 is also called an amplifier and is attached to each propeller. The ESC 219 controls the revolutions per minute (RPM) of a motor according to instructions from the CPU 211. The control is conducted on the RPMs of propellers 220 to cause a difference in air pressure above and below the propellers, and the difference in the air pressure provides a lift that enables the unmanned aerial vehicle 2 to fly. Lift is upward force that pushes up the unmanned aerial vehicle 2. The speed and the direction of travel of the unmanned aerial vehicle 2 can be changed by varying the RPMs of the propellers 220.

The control of the RPMs of the propellers 220 allows the unmanned aerial vehicle 2 to hover (the lift and the force of gravity are equivalent), ascend (increase in the RPMs of four motors), descend (decrease in the RPMs of the four motors), move back and forth and left to right (the increase in the RPMs of two propellers opposite to the direction of travel moves the unmanned aerial vehicle in the direction of travel), turn counterclockwise (increase in the RPMs of right-hand propellers), turn clockwise (increase in the RPMs of left-hand propellers) and so on.

Figure 3:
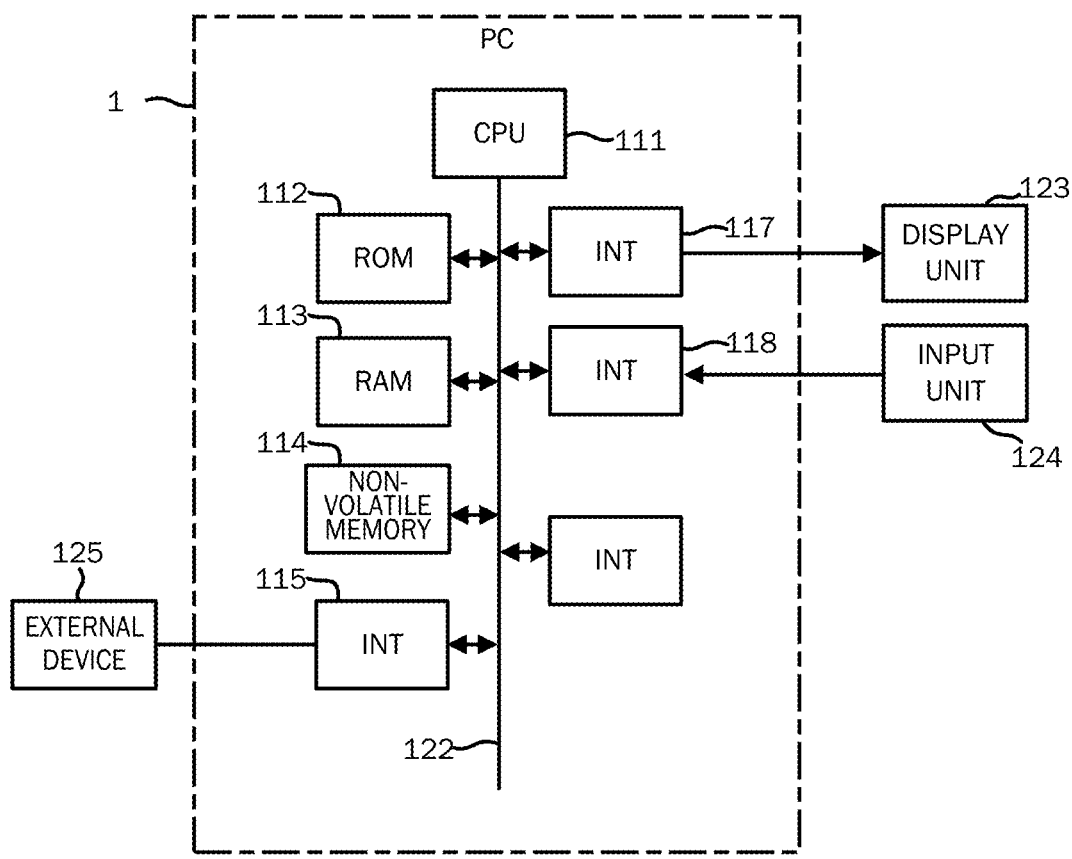
FIG. 3 is a hardware configuration diagram of a PC.

The PC 1 has a hardware configuration shown in FIG. 3.

The PC 1 includes a CPU 111 that is a processor configured to control the overall PC 1. The CPU 111 reads a system program stored in a ROM 112 via a bus 122 to thereby control the overall PC 1 according to the system program. A RAM 113 is configured to temporarily store temporary computation data and display data, various pieces of data input by an external device and others.

A non-volatile memory 114 consists of a memory or a solid state device (SSD) which is backed up by a battery, not shown, by way of example. In the non-volatile memory 114, a state of storage of data written therein is retained even when a power source of the PC 1 is turned off. The non-volatile memory 114 is configured to store, for example, pieces of data read from an external device 125 via an interface 115, pieces of data input through an input unit 124, and pieces of data acquired from the unmanned aerial vehicle via a radio communication device. The pieces of data stored in the non-volatile memory 114 may be deployed into the RAM 113 when executing/using the data. Furthermore, the ROM 112 is configured to record beforehand various system programs, such as known programs.

A display unit 123 is configured to output and display pieces of data or others which are obtained by executing the pieces of data, programs or others loaded on the memory via an interface 117. In addition to that, the input unit 124 that consists of a keyboard, a pointing device and others is configured to pass data and others input by a programmer via an interface 118 to the CPU 111.

Figure 4:
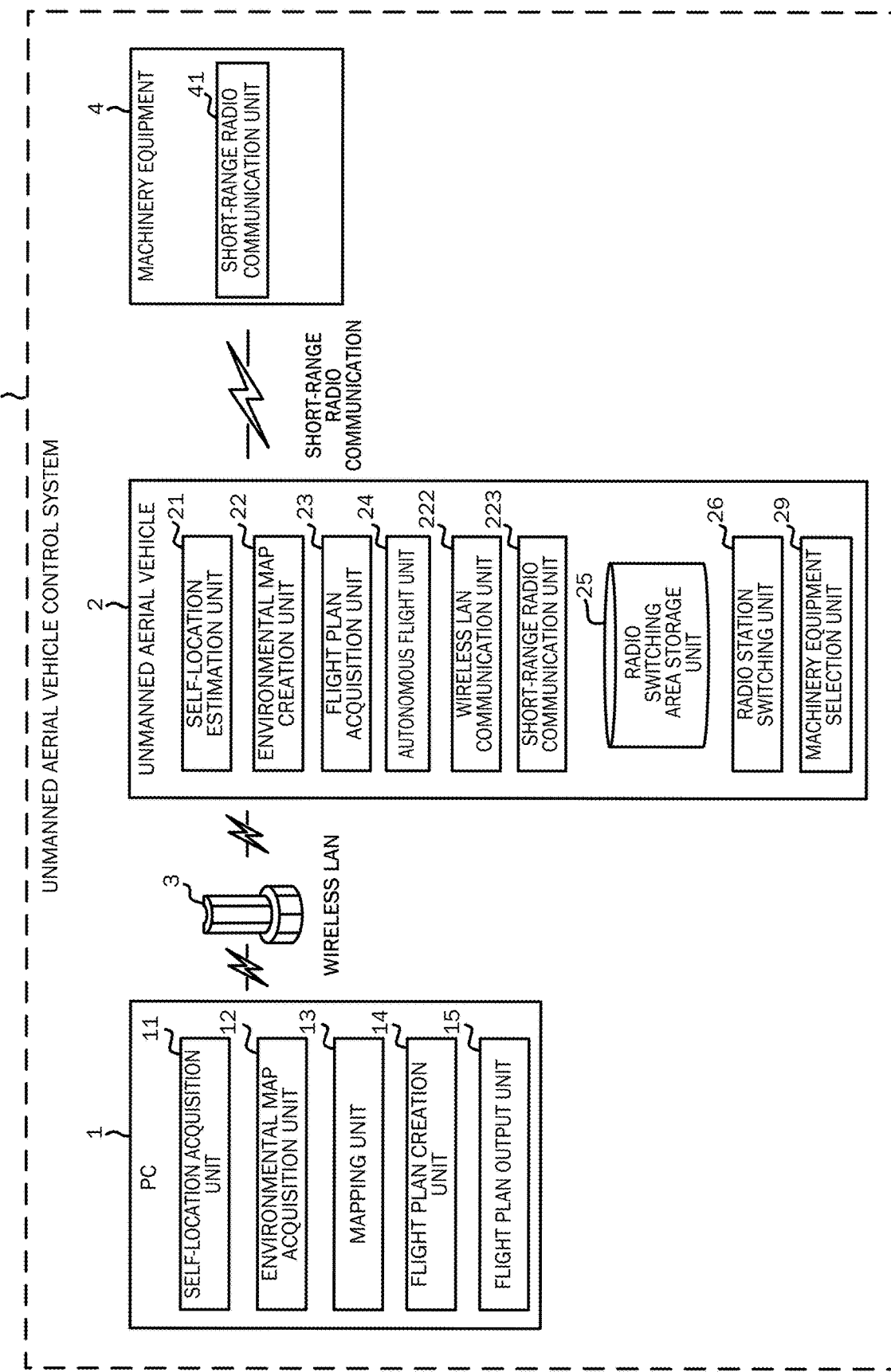
FIG. 4 is a block diagram of an unmanned aerial vehicle control system according to a first disclosure.

FIG. 4 is a block diagram of the unmanned aerial vehicle control system 100. The unmanned aerial vehicle control system 100 includes one or more unmanned aerial vehicles 2, a personal computer (PC) 1 that creates a flight plan of the unmanned aerial vehicle 2, a radio communication device 3 that serves as an access point in a wireless LAN, and a machinery equipment 4 that is a radio station for short-range radio communication.

The PC 1 includes a self-location acquisition unit 11 that acquires a self-location of the unmanned aerial vehicle 2, an environmental map acquisition unit 12 that acquires an environmental map of the unmanned aerial vehicle 2, a mapping unit 13 that maps the self-location of the unmanned aerial vehicle 2 on a three-dimensional map, a flight plan creation unit 14 that creates a flight plan of the unmanned aerial vehicle 2, and a flight plan output unit 15 that outputs a flight plan of the unmanned aerial vehicle 2.

The self-location acquisition unit 11 is configured to acquire the self-location of the unmanned aerial vehicle 2 through the radio communication device 3. The self-location of the unmanned aerial vehicle 2 is a location of the unmanned aerial vehicle 2 determined by the unmanned aerial vehicle 2 based on values obtained from the accelerometer, the angular velocity sensor and the distance sensor.

The environmental map acquisition unit 12 is configured to acquire an environmental map of the unmanned aerial vehicle 2 through the radio communication device 3. Environmental map means point group data around the unmanned aerial vehicle 2. An environmental map is created based on the values obtained from the distance sensor, for instance. The self-location of the unmanned aerial vehicle 2 can be also estimated by using intensity of radio waves of beacons, Wi-Fi or similar. In a case of utilizing radio waves of beacons or Wi-Fi, an environmental map is not necessarily created because the coordinates of the unmanned aerial vehicle 2 can be tracked. In a case where an environmental map is created, information about the surroundings of the unmanned aerial vehicle 2 can be acquired in real time to detect unexpected obstacles.

The mapping unit 13 is configured to associate the environmental map of the unmanned aerial vehicle 2 with a three-dimensional map based on characteristic points or the like, so as to map the self-location of the unmanned aerial vehicle 2 on a coordinate system of the three-dimensional map. The flight plan creation unit 14 is configured to create a flight plan of the unmanned aerial vehicle 2.

The flight plan output unit 15 is configured to output the flight plan to the unmanned aerial vehicle 2 via the wireless LAN by the radio communication device 3. The flight plan includes the self-location of the unmanned aerial vehicle 2 on the three-dimensional map. The flight plan may be stored in the non-volatile memory 214 of the unmanned aerial vehicle 2. The flight plan may include a start time of the flight.

The unmanned aerial vehicle 2 includes a self-location estimation unit 21 that estimates a self-location, an environmental map creation unit 22 that creates an environmental map surrounding the unmanned aerial vehicle 2, a flight plan acquisition unit 23 that acquires a flight plan of the unmanned aerial vehicle 2, an autonomous flight unit 24 that makes autonomous flight according to the flight plan or a move command, a wireless LAN communication unit 222 that conducts wireless LAN communication, a short-range radio communication unit 223 that conducts radio communication with each machinery equipment 4, a radio switching area storage unit 25 that stores an area showing a boundary of switching point of radio communication, a radio station switching unit 26 that switches radio stations, and a machinery equipment selection unit 29 that selects a pre-selected base station.

The self-location estimation unit 21 is configured to determine tilt and movement of the unmanned aerial vehicle 2 based on an amount of speed variation of the unmanned aerial vehicle 2 acquired by the accelerometer, determines changes in the tilt and the direction of the unmanned aerial vehicle 2 based on an amount of change in a rotational speed of the unmanned aerial vehicle 2 acquired from the angular velocity sensor, and determines the altitude of the unmanned aerial vehicle 2 based on air pressure acquired from the pressure sensor, thereby determining a movement amount of the aerial vehicle itself. In addition to that, the self-location estimation unit 21 conducts matching on the environmental map to continuously estimate the movement amount of the unmanned aerial vehicle 2. The movement amount is added up so that a self-location can be estimated.

The environmental map creation unit 22 is also configured to determine two-dimensional or three-dimensional point group data based on a value of scattering light acquired by the LIDAR sensor. The point group data will be an environmental map surrounding the unmanned aerial vehicle 2.

The flight plan acquisition unit 23 is configured to acquire the flight plan from the radio communication device 3 or the machinery equipment 4. The flight plan includes the self-location of the unmanned aerial vehicle 2 on the three-dimensional map.

The wireless LAN communication unit 222 is a Wi-Fi (registered trademark) adaptor, for instance. The wireless LAN communication unit 222 is configured to conduct communication with the radio communication device 3. The communication area of the radio communication device 3 includes all over the factory (or throughout the flight route of the unmanned aerial vehicle 2).

The short-range radio communication unit 223 is a Bluetooth (registered trademark) adaptor, for instance. The short-range radio communication unit 223 of the unmanned aerial vehicle 2 is configured to conduct communication with a short-range radio communication unit 41 incorporated in the machinery equipment 4.

The radio switching area storage unit 25 is configured to store areas that divide a three-dimensional or two-dimensional map of the factory and a radio station to which the unmanned aerial vehicle 2 needs to connect in each area. For example, the radio switching area storage unit stores "Area 1" as "wireless LAN" and "Area 2" as "short-range radio station (device ID)", as shown in FIG.

The radio station switching unit 26 is configured to refer to the radio switching area storage unit 25 to detect a radio station existing in an area on the three-dimensional map or two-dimensional map where the self-location of the unmanned aerial vehicle 2 is found.

The machinery equipment selection unit 29 is configured to determine whether or not the radio station existing in the area where the unmanned aerial vehicle 2 is found is attached to a pre-selected machinery equipment 4. When the radio station is attached to the pre-selected machinery equipment, the selection unit 29 conducts switching between the radio stations. When the radio station is attached to a machinery equipment which is not selected beforehand, the selection unit 29 does not conduct the switching between the radio stations.

The selection of the machinery equipment 4 may be carried out before making autonomous flight or during the autonomous flight.

The selection of the machinery equipment 4 may be performed by manual input, or by inputting with an information processing device, such as an external system. For example, if a drone carries out a regular task based on an external program, a machinery equipment 4 specified in the program may be selected automatically. If a moving route to a machinery equipment 4 to be subject to a task is automatically computed based on a route computation algorithm, the machinery equipment (radio station) can be selected according to which area contains the current location of the drone.

The radio station in the illustrative disclosure means a transmitter or receiver that conducts communication over the radio, or a combination of the transmitter and the receiver. In other words, all of the wireless LAN communication unit 222 and the short-range radio communication unit 223 of the unmanned aerial vehicle 2, the radio communication device 3, and the short-range radio communication unit 223 of the machinery equipment 4 in this disclosure are radio stations.

The machinery equipment 4 is provided with a short-range radio communication unit 41. The short-range radio communication unit 41 is a Bluetooth adaptor, by way of example. The short-range radio communication unit 41 is configured to output a packet at regular time intervals. The packet contains a device address, a device name and others of the machinery equipment 4. Upon receipt of the packet, the short-range radio communication unit 223 of the unmanned aerial vehicle 2 sends back a response to the short-range radio communication unit 41 of the machinery equipment 4 to thereby establish connections.

With reference to a flowchart in FIG. 6, a description will be made on an operation of the unmanned aerial vehicle control system 100.

Firstly, the unmanned aerial vehicle 2 estimates its self-location (Step S1), and in turn creates an environmental map (Step S2). The PC 1 maps the self-location of the unmanned aerial vehicle 2 and the environmental map onto a three-dimensional map of a factory, so as to acquire the location of the unmanned aerial vehicle 2 on the three-dimensional map (Step S3).

The PC 1 creates a flight plan of the unmanned aerial vehicle 2 (Step S4), and outputs the created plan to the unmanned aerial vehicle 2. The user selects a machinery equipment 4 to be communication with (Step S5). The selected machinery equipment 4 is registered in the unmanned aerial vehicle 2. In here, a machinery equipment 4 that conducts radio communication is selected before starting autonomous flight, but the machinery equipment 4 may be selected during the autonomous flight and registered in the unmanned aerial vehicle 2.

The unmanned aerial vehicle 2 makes autonomous flight according to the flight plan received from the PC 1 (Step S6).

The unmanned aerial vehicle 2 refers to a radio switching area storage unit 25 to determine an area where the self-location of the unmanned aerial vehicle 2 is found (Step S7). If the area where the self-location of the unmanned aerial vehicle 2 changed (Step S8: Yes), it is determined that the unmanned aerial vehicle 2 has moved into a new area (Step S9). If the area where the self-location of the unmanned aerial vehicle 2 is found does not change (Step S8: No), the procedure goes to Step S6 and the unmanned aerial vehicle 2 keeps the autonomous flight.

If it is determined that the unmanned aerial vehicle has moved into the new area, the unmanned aerial vehicle 2 checks the surrounding radio wave state (Step S10). In a case where the unmanned aerial vehicle 2 flies near the machinery equipment 4, radio waves indicating the existence of the machinery equipment 4 reach the unmanned aerial vehicle 2. When the unmanned aerial vehicle 2 receives the radio waves of the machinery equipment 4, the short-range radio communication unit 223 of the unmanned aerial vehicle 2 establishes connection with the short-range radio communication unit 41 of the machinery equipment 4 (Step S11), and then switches the radio stations (Step S12).

In this case, the machinery equipment 4 may relay data from the PC 1, or the machinery equipment 4 may directly control the unmanned aerial vehicle 2. In a case where the machinery equipment 4 directly controls the unmanned aerial vehicle 2, the machinery equipment 4 preferably has operational equipment, such as a numerical controller or a programmable logic controller (PLC).

As described above, the unmanned aerial vehicle control system 100 according to the first disclosure has the radio switching area storage unit 25 that divides the three-dimensional map of the factory into areas and registers a radio station suitable for each area. These areas can be formed by actually measuring the state of radio waves in the factory. The unmanned aerial vehicle 2 switches the radio stations while checking in which area it is flying.

There are various radio systems in the factory, and radio noise from the machinery equipment 4 or others may cause instability of the radio communication. In addition, there are areas where the radio waves in the factory are difficult to reach, such as the inside or the vicinity of a machine tool. If the control of the unmanned aerial vehicle 2 is conducted inside the housing of a machine tool (specifically large machine tool), the housing may cause communication failure.

In an area where the state of the radio waves of the wireless LAN is not good, the unmanned aerial vehicle control system 100 changes the communication mode into the short-range communication in the vicinity of the machinery equipment 4, so that the system 100 can control the unmanned aerial vehicle 2 even in a place where the radio waves in the factory are difficult to reach, such as the inside or the vicinity of the machine tool.

The distance between the radio station and the unmanned aerial vehicle 2 may be measured to switch the connection when the unmanned aerial vehicle 2 comes close to the radio station. The distance from the radio station can be obtained in such a way that a Euclidean distance is computed from the coordinates of the self-location and the radio station, or that images taken by the unmanned aerial vehicle 2 are used to compute the distance from the machinery equipment 4. The beacons from the radio station may also be used as a distance sensor. Furthermore, a threshold value of a distance to be switched may be set for each machinery equipment because a range of the short-range radio varies among the machinery equipment.

The radio connection protocol is not limited to the above, and thus radio connection based on protocols different from those in the illustrative disclosure may be included in the principle of the disclosure.

<Second Disclosure>

Figure 7:
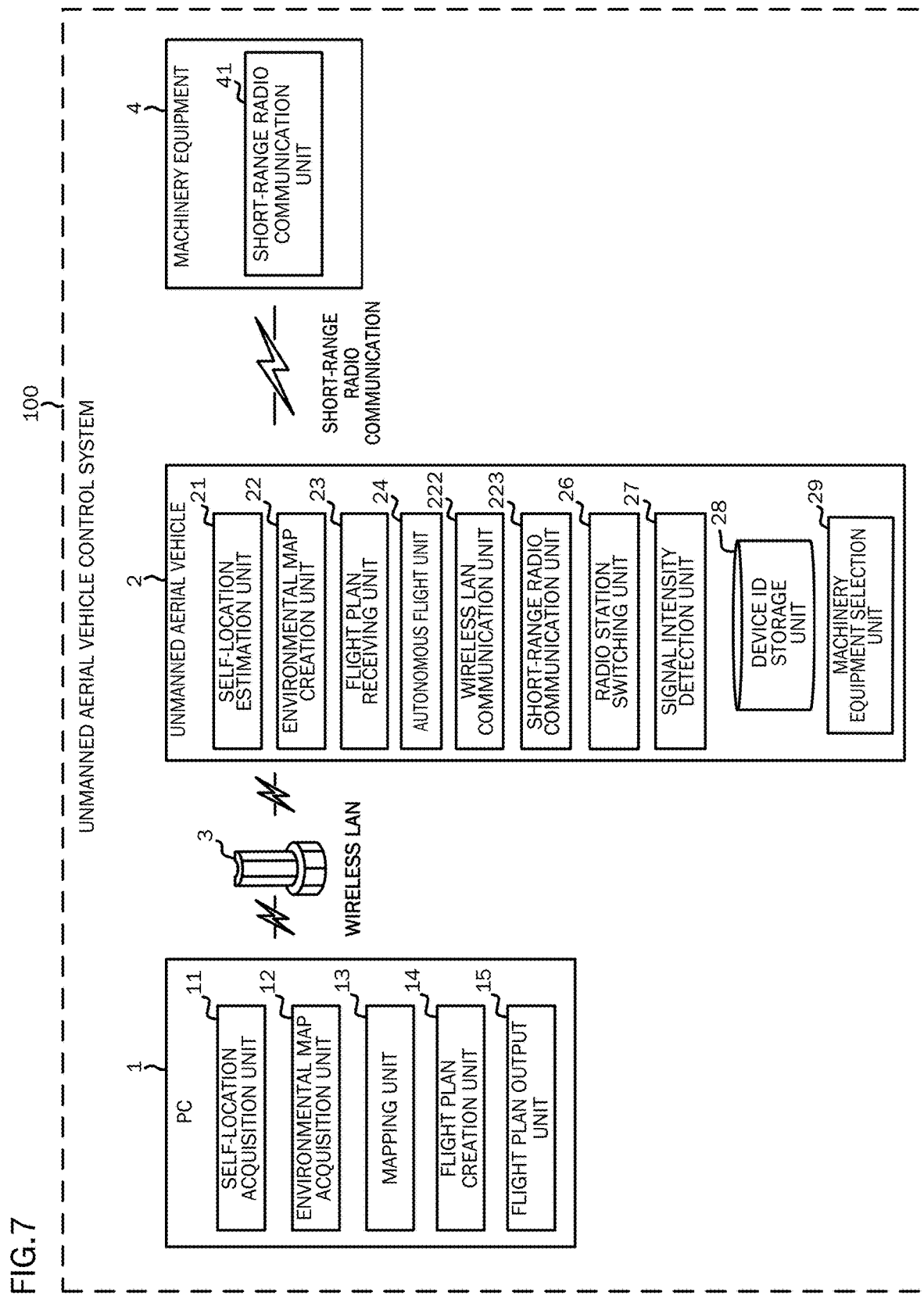
FIG. 7 is a block diagram of an unmanned aerial vehicle according to a second disclosure.

The unmanned aerial vehicle control system 100 according to a second disclosure includes a signal intensity detection unit 27 and a device ID storage unit 28, as shown in FIG. 7.

The signal intensity detection unit 27 is configured to detect radio waves output from the radio communication device 3 and signal intensity in the machinery equipment 4.

The device ID storage unit 28 is configured to store a device ID that is identification information of the short-range radio communication unit 41 incorporated in the machinery equipment 4. The device ID storage unit 28 also stores a machinery equipment 4 that is selected as a communication party.

The radio station switching unit 26 compares the signal intensity detected by the signal intensity detection unit 27, and if there is a radio station having a signal status better than the signal status in the currently-connected radio station and if the device ID of the concerned radio station is recorded in the device ID storage unit 28 while the machinery equipment 4, whose signal intensity is compared as above, is selected as the communication party, the radio station switching unit 26 switches the radio stations.

Figure 8:
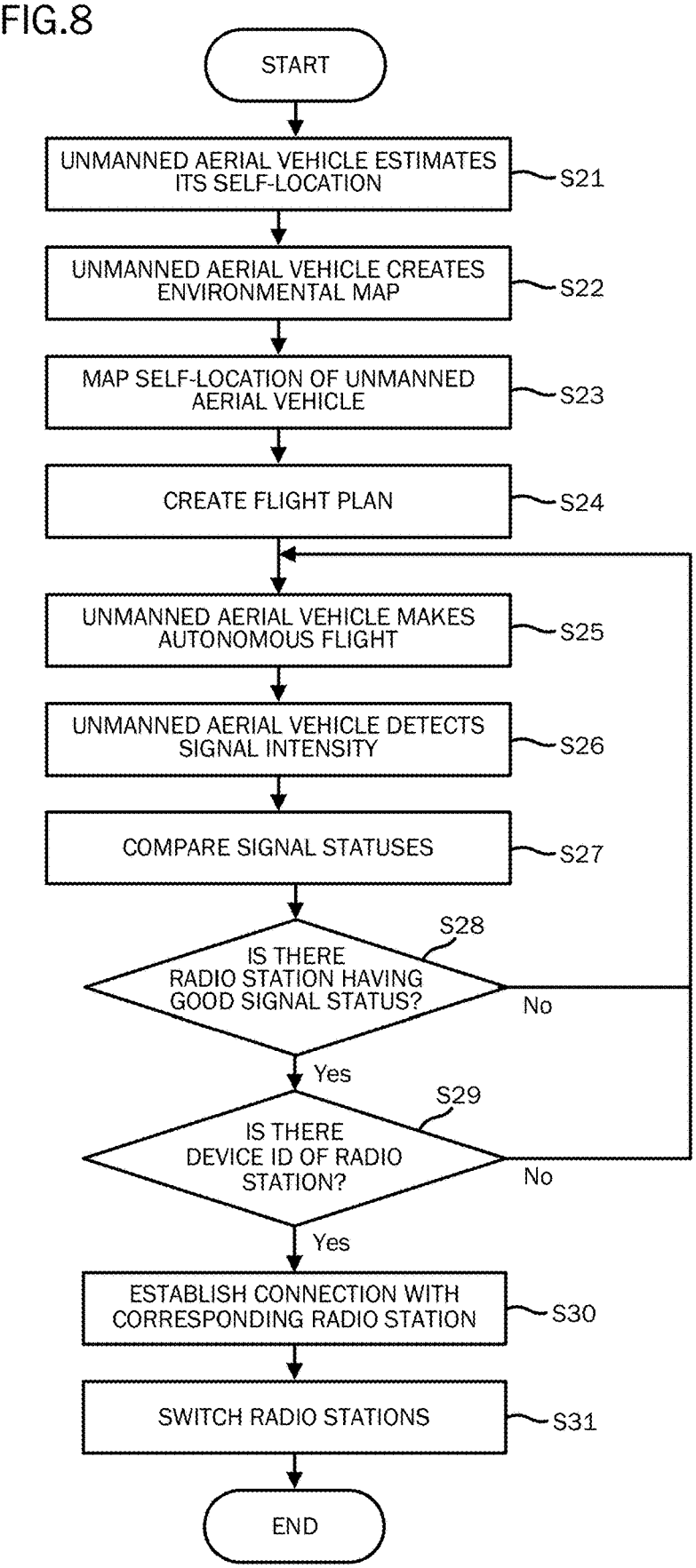
FIG. 8 is a flowchart illustrating an operation of the unmanned aerial vehicle control system according to the second disclosure.

By referring to a flowchart shown in FIG. 8, an operation of the unmanned aerial vehicle control system 100 will be described.

First, the unmanned aerial vehicle 2 estimates its self-location (Step S21), and in turn creates an environmental map (Step S22). The PC 1 then maps the self-location of the unmanned aerial vehicle 2 and the environmental map onto a three-dimensional map of a factory to thereby obtain the location of the unmanned aerial vehicle 2 on the three-dimensional map (Step S23).

The PC 1 creates a flight plan of the unmanned aerial vehicle 2 (Step S24), and outputs the created plan to the unmanned aerial vehicle 2. The unmanned aerial vehicle 2 then makes autonomous flight according to the flight plan received from the PC 1 (Step S25).

The unmanned aerial vehicle 2 detects signal intensity (Step S26). The unmanned aerial vehicle 2 then compares the signal intensity of the currently-connected radio station with the signal intensity of the other radio stations (Step S27). If there is no radio station having a signal status better than that of the currently-connected radio station (Step S28: No), the unmanned aerial vehicle 2 proceeds to Step 25 to continue the autonomous flight.

If there is a radio station having a signal status better than that of the currently-connected radio station (Step S28: Yes) and the device ID of the concerned radio station is present in the device ID storage unit 28 (Step S29: Yes), connection with the short-range radio connection unit 41 having this device ID is established (Step S30) to thereby switch the radio stations (Step S31).

If the device ID of the radio station detected in Step S28 is not present in the device ID storage unit 28 (Step S29: No), the unmanned aerial vehicle 2 proceeds to Step S25 to continue the autonomous flight.

As described above, the unmanned aerial vehicle control system 100 according to the second disclosure utilizes the signal intensity to detect that the unmanned aerial vehicle comes close to a target machinery equipment 4. The signal intensity is defined as criteria for selecting the radio stations to reliably switch to a radio station having a good signal status.

<Third Disclosure>

Figure 6:
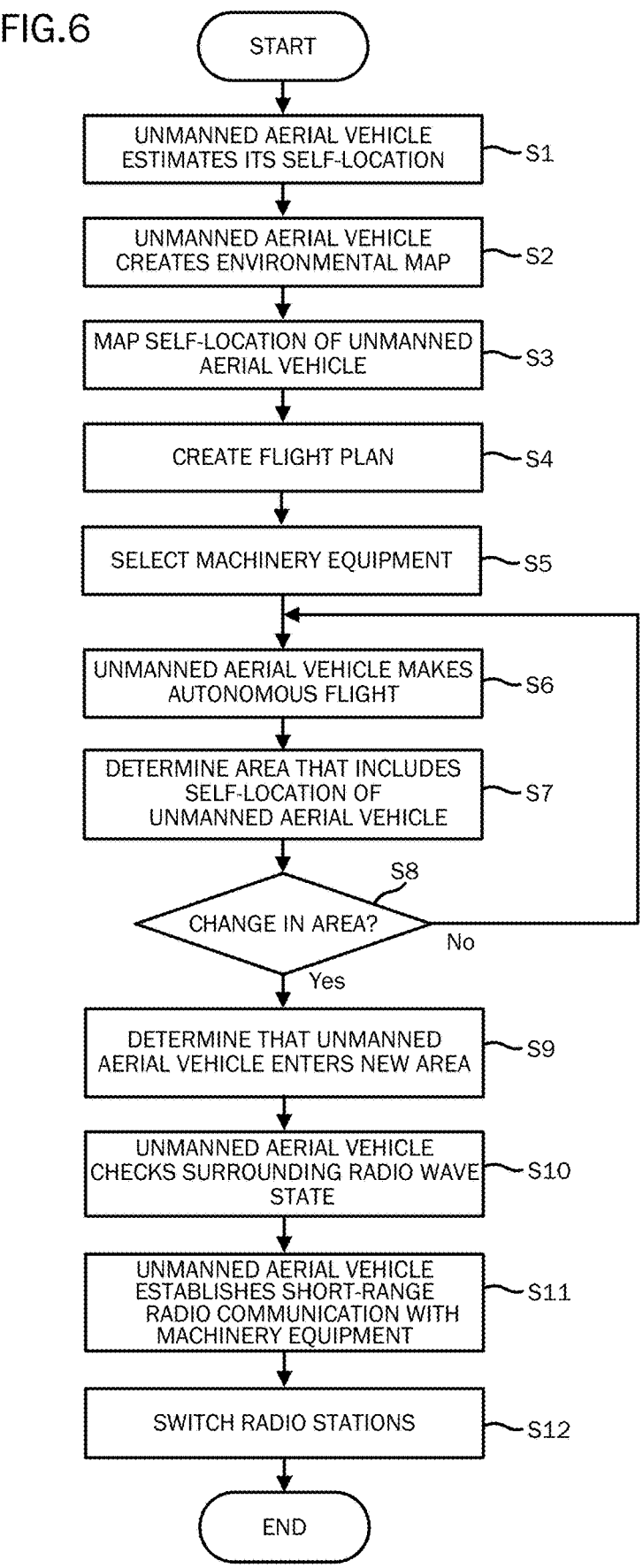
FIG. 6 is a flowchart illustrating an operation of the unmanned aerial vehicle control system according to the first disclosure.

The unmanned aerial vehicle control system 100 according to a third disclosure has approximately the same configuration as that of the unmanned aerial vehicle control system 100 of the second disclosure shown in FIG. 6. The unmanned aerial vehicle control system 100 of the third disclosure stores the device IDs of multiple machinery equipment 4 in the device ID storage unit 28 of the unmanned aerial vehicle 2.

Figure 9:
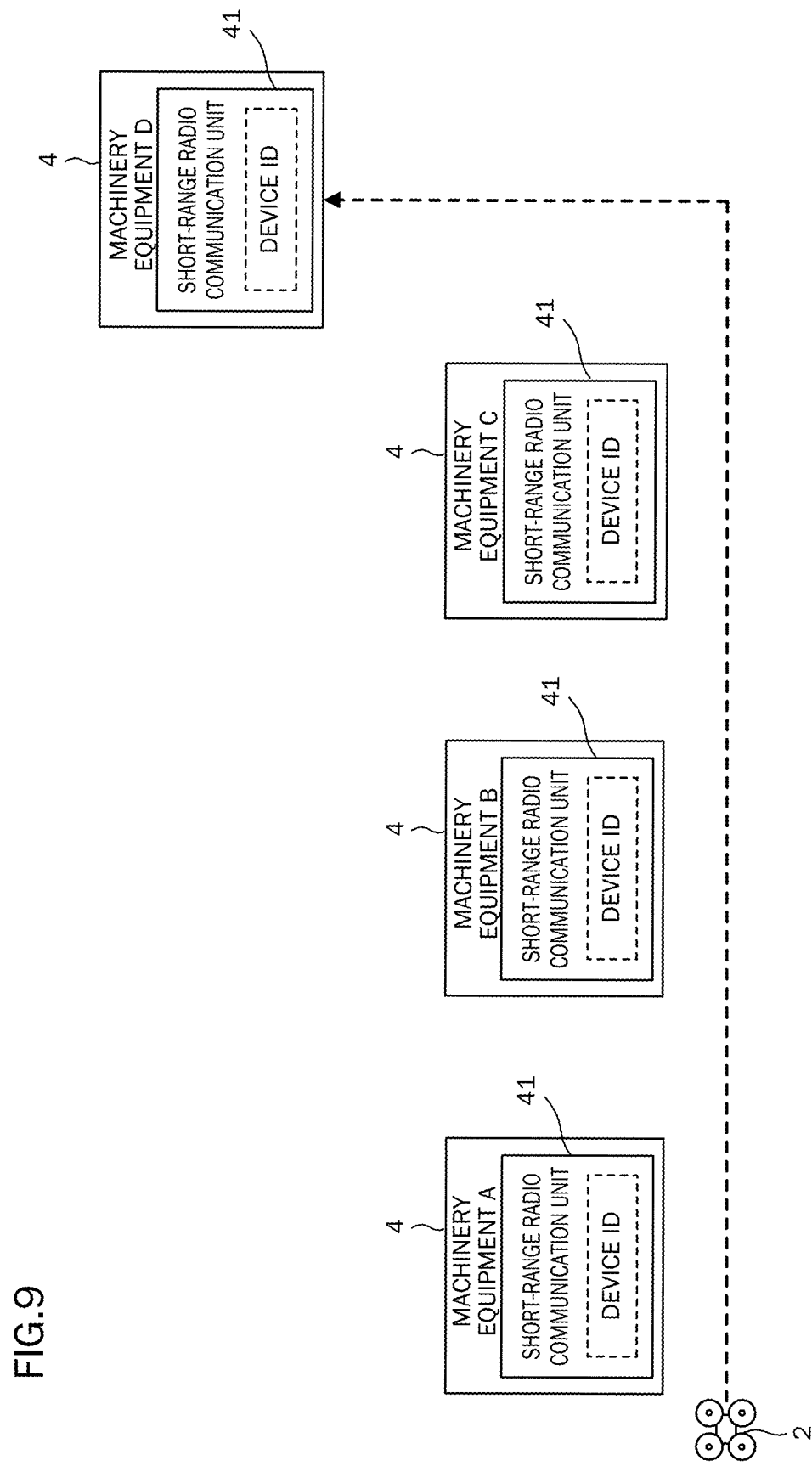
FIG. 9 shows an example of a flight route of the unmanned aerial vehicle.

In the unmanned aerial vehicle control system 100 of the third disclosure, the unmanned aerial vehicle 2 flies by switching the short-range radio connection units 41 of the multiple machinery equipment 4. For example, when the unmanned aerial vehicle 2 moves on a flight route as shown in FIG. 9, there are four machinery equipment 4 in the vicinity of the flight route of the unmanned aerial vehicle 2. The unmanned aerial vehicle 2 makes flight by switching between the radio stations having the good signal statuses among the short-range radio communication unit 41 of Machinery equipment A, the short-range radio communication unit 41 of Machinery equipment B, the short-range radio communication unit 41 of Machinery equipment C and the short-range radio communication unit 41 of Machinery equipment D. Consequently, stable communication can be established even in a place such as a factory where the radio wave state is unstable.

The device ID storage unit 28 may store the device IDs of all short-range radio communication units 41 in the factory. As the number of the device IDs increases, the area available for short-range radio communication expands. It expands the options for communication methods, and the unmanned aerial vehicle 2 can be controlled using only the short-range radio without a wireless environment, such as wireless LAN, that covers the entire factory.

The invention claimed is:

1. An unmanned aerial vehicle control system for controlling an unmanned aerial vehicle to fly in a factory, the unmanned aerial vehicle control system comprising:
   the unmanned aerial vehicle;
   a computer configured to create a flight plan for the unmanned aerial vehicle;
   a radio communication device having a communication coverage area that encompasses an entirety of the factory or an entirety of a flight route of the unmanned aerial vehicle; and
   machinery equipment provided with a radio station,
   wherein the unmanned aerial vehicle comprises:
      a first radio communication unit that conducts short-range radio communication with the machinery equipment equipped with the radio station arranged in the factory;
      a second radio communication unit that conducts radio communication having a communication range longer than that of the short-range radio communication;
      a machinery equipment selection unit that makes determination whether or not the machinery equipment equipped with the radio station is pre-selected as a communication party; and a radio station switching unit that detects that a self-location of the unmanned aerial vehicle flying in the factory is in a vicinity of the selected machinery equipment, and in response to detecting the self-location of the unmanned aerial vehicle being in the vicinity of the selected machinery equipment, switches from the second radio communication unit to the first radio communication unit so as to switch connection to the radio station attached to the machinery equipment for the short-range radio communication, wherein the second radio communication unit conducts communication with the radio communication device, and the second radio communication unit communicates, through the radio communication device, with the computer that creates the flight plan of the unmanned aerial vehicle.

2. The unmanned aerial vehicle control system according to claim 1, wherein the unmanned aerial vehicle further comprises:

an autonomous flight unit that carries out autonomous flight according to the flight plan; and a radio switching area storage unit that stores areas into which a map of the factory is divided and a radio station to which the unmanned aerial vehicle should connect in each area, wherein the machinery equipment selection unit acquires a machinery equipment selection result before starting flight or during the flight, the radio station switching unit switches the connection to the radio station of the selected machinery equipment that exists in an area where the unmanned aerial vehicle is present.

3. The unmanned aerial vehicle control system according to claim 1, wherein the unmanned aerial vehicle further comprises:

a signal intensity detection unit that detects signal intensity for each of a plurality of radio stations; and an identification information storage unit that stores identification information about at least one radio station of the plurality of radio stations, wherein the radio station switching unit compares the signal intensity detected by the signal intensity detection unit to switch the connection to a radio station that has a signal status better than a signal status in a currently-connected radio station and has its identification information stored in the identification information storage unit.

4. A non-transitory storage medium that stores computer-readable commands for an unmanned aerial vehicle control system comprising:

an unmanned aerial vehicle;

a computer configured to create a flight plan for the unmanned aerial vehicle;

a radio communication device having a communication coverage area that encompasses an entirety of the factory or an entirety of a flight route of the unmanned aerial vehicle; and machinery equipment provided with a radio station, wherein the unmanned aerial vehicle comprises: one or more processors; a first radio communication unit that conducts short-range radio communication with the machinery equipment equipped with the radio station; and a second radio communication unit that conducts radio communication having a communication range longer than that of the short-range radio communication, the computer-readable commands, when executed by the one or more processors of the unmanned aerial vehicle, cause the one or more processors of the unmanned aerial vehicle to execute:

determining whether or not the machinery equipment equipped with the radio station is selected as a communication party by a user;

detecting that a self-location of the unmanned aerial vehicle flying in the factory is in a vicinity of the selected machinery equipment; and in response to detecting the self-location of the unmanned aerial vehicle being in the vicinity of the selected machinery equipment, switching from the second radio communication unit to the first radio communication unit to switch connection to the radio station attached to the machinery equipment for the short-range radio communication, wherein the second radio communication unit conducts communication with the radio communication device, and the second radio communication unit communicates, through the radio communication device, with the computer that creates the flight plan of the unmanned aerial vehicle.

5. The non-transitory storage medium according to claim 4, wherein the computer-readable commands, when executed by the one or more processors of the unmanned aerial vehicle, further cause the one or more processors of the unmanned aerial vehicle to execute:

causing the unmanned aerial vehicle to make autonomous flight according to the flight plan;

storing, in a memory of the unmanned aerial vehicle, areas into which a map of the factory is divided and a radio station to which the unmanned aerial vehicle should connect in each area;

selecting the machinery equipment equipped with the radio station as the communication party before starting flight or during the flight; and switching the connection to the radio station of the selected machinery equipment that exists in an area where the unmanned aerial vehicle is present.

6. The non-transitory storage medium according to claim 4, wherein the computer-readable commands, when executed by the one or more processors of the unmanned aerial vehicle, further cause the one or more processors of the unmanned aerial vehicle to execute:

storing, in a memory of the unmanned aerial vehicle, identification information of at least one radio station of a plurality of radio stations;

detecting signal intensity for each radio station of the plurality of radio stations;

comparing the detected signal intensity; and switching connection to a radio station having a signal status better than a signal status in a currently-connected radio station and having its identification information stored in the memory among the plurality of radio stations whose signal intensity is detected.

7. The unmanned aerial vehicle control system according to claim 1, wherein
the unmanned aerial vehicle outputs environmental map information from the second radio communication unit to the computer via the radio communication device, and
the unmanned aerial vehicle receives, from the computer via the second radio communication unit and the radio communication device, the flight plan for the unmanned aerial vehicle created based on the environmental map information, the flight plan including the flight route of the unmanned aerial vehicle.

8. The non-transitory storage medium according to claim 4, wherein the computer-readable commands, when executed by the one or more processors of the unmanned aerial vehicle, further cause the one or more processors of the unmanned aerial vehicle to execute:
outputting environmental map information from the second radio communication unit to the computer via the radio communication device, and
receiving, from the computer via the second radio communication unit and the radio communication device, the flight plan for the unmanned aerial vehicle created based on the environmental map information, the flight plan including the flight route of the unmanned aerial vehicle.

* * * * *